United States Patent
Benway et al.

[19]

[11] Patent Number: 5,844,190
[45] Date of Patent: Dec. 1, 1998

[54] ORBITAL WELDING APPARATUS

[75] Inventors: Ernest A. Benway, Mentor; James M. Kane; Charles N. Richards, both of Twinsburg, all of Ohio

[73] Assignee: Cajon Company, Macedonia, Ohio

[21] Appl. No.: 763,849

[22] Filed: Dec. 3, 1996

Related U.S. Application Data

[63] Continuation of Ser. No. 614,097, Mar. 12, 1996, abandoned.

[51] Int. Cl.⁶ .................................................... B23K 9/12
[52] U.S. Cl. ..................................... 219/60 A; 219/125.11
[58] Field of Search ............................ 219/60 A, 125.11, 219/61

[56] References Cited

U.S. PATENT DOCUMENTS

| | | | |
|---|---|---|---|
| 3,395,262 | 7/1968 | Kazlauskas | 219/60 A |
| 4,379,215 | 4/1983 | Rohrberg | 219/60 A |
| 4,841,115 | 6/1989 | Severin et al. | 219/60 A |
| 5,136,134 | 8/1992 | Benway et al. | 219/60 A |
| 5,223,686 | 6/1993 | Benway et al. | 219/60 A |

*Primary Examiner*—Clifford C. Shaw
*Attorney, Agent, or Firm*—Calfee, Halter & Griswold

[57] ABSTRACT

An orbital welding apparatus (B) comprises a modular weld head apparatus (10) including a rotor assembly (20) which carries a welding electrode (26). The rotor assembly is rotated about an axis for welding abutting ends of tubular members positioned in alignment on the axis. The rotor assembly includes a C-shaped insulating rotor member (22) which has teeth (28) disposed around an outside periphery thereof. The insulating rotor member is configured to receive an electrically conductive member (24). The conductive member is insulated by the rotor member to reduce arcing from the conductive member to other components. A drive assembly (98) within the weld head assembly engages the insulating rotor member to rotate the rotor assembly about the axis during welding.

18 Claims, 4 Drawing Sheets

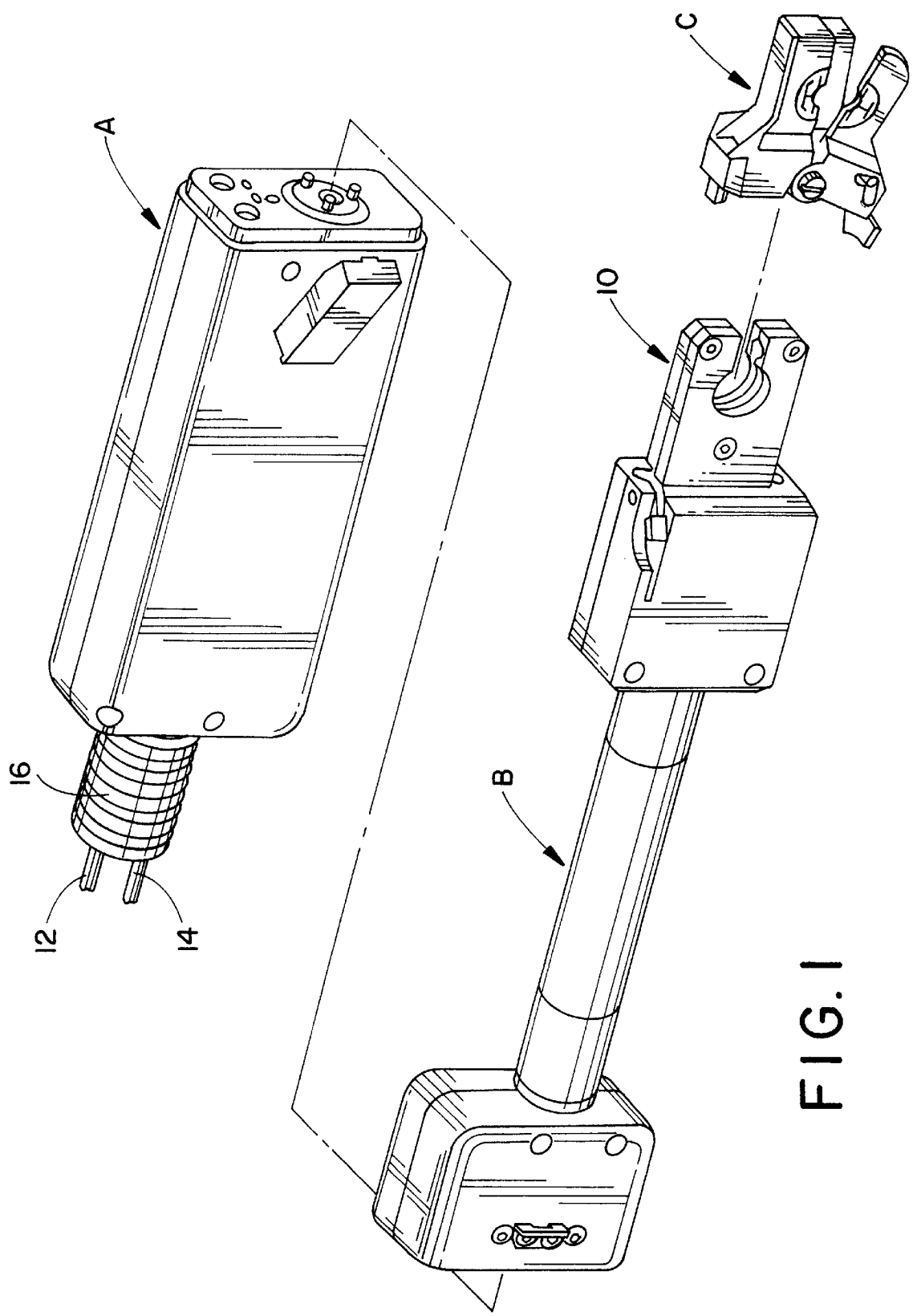

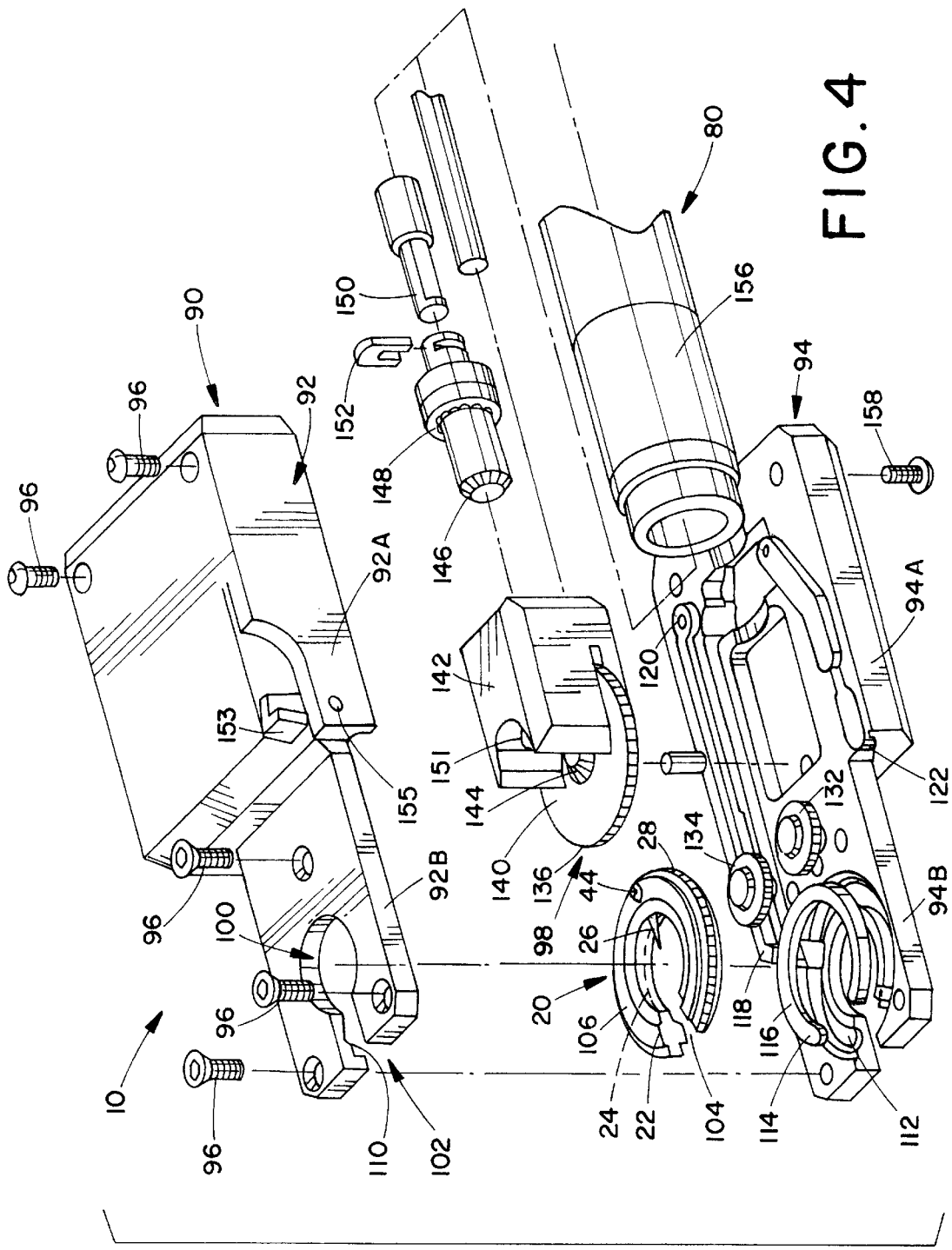

ORBITAL WELDING APPARATUS

This is a continuation of U.S. application Ser. No. 08/614,097 filed Mar. 12, 1996 now abandoned.

BACKGROUND OF THE INVENTION

The subject invention relates to the art of welding. It finds particular application in conjunction with orbital welding systems for cylindrical products such as tubes or rods.

The invention is especially suited for incorporation in apparatus for welding small diameter tubing together. It should be appreciated, however, that the invention is capable of broader application and could be used in many different welding devices of widely varying sizes for many purposes.

Orbital arc welding equipment is often used to weld tubing and piping for use in fluid handling and processing systems. See, for example, prior commonly assigned U.S. Pat. Nos. 4,379,215; 5,136,134, and 5,223,686, the disclosures of which are incorporated herein by reference.

Currently, there is significant interest in welding small diameter tubing, fittings, and control equipment such as valves, filters, and the like to form small, compact control and processing systems. Frequently, the various components must be welded in confined and nearly inaccessible areas. In addition, system designers are desirous of reducing, to the greatest extent possible, the size of the processing and control systems by reducing the distance between components.

In the previous orbital welding devices, the housing held a rotor assembly. The rotor assembly included a C-shaped metal rotor or drive member, a C-shaped electrically conductive member secured to the drive member in a side-by-side relationship, and a welding electrode. In another design, a one-piece electrically conductive rotor carried the welding electrode. The housing was electrically non-conductive and served to insulate the rotor assembly. Reducing the size of the components of the weld head and rotor assembly caused the welding electrode to become in close proximity to the ends of the conductive member. During welding, the close proximity to the electrode caused arcing at various points along the conductive member especially at the ends. When this arcing occurred, it was very destructive to the components of the weld head and fixture block as well as the tubing being welded.

The present invention provides a new and improved rotor assembly for an orbital welding apparatus which overcomes the above-referenced problems and others.

SUMMARY OF THE INVENTION

In accordance with the present invention, a new and improved apparatus for welding ends of cylindrical components is provided. A housing defines a weld head and is configured to receive and rotate a generally C-shaped electrically non-conductive rotor about an axis. One side of the rotor defines a cavity therein which extends along a portion of the one side. An electrically conductive member is disposed in the cavity of the rotor so that the rotor insulates the electrically conductive member. The rotor further carries a welding electrode which extends radially inward toward the axis and is in electrical contact with the electrically conductive member.

In accordance with a more limited aspect of the present invention, the rotor includes a plurality of teeth along an outside periphery of the rotor. The teeth extend radially outward from the axis.

In accordance with a more limited aspect of the present invention, the rotor and the teeth are made from a material which is electrically non-conductive and is temperature resistant. The material includes polybenzimidazole or a suitable ceramic.

One advantage of the present invention is that the rotor carries the electrically conductive member within it and insulates the conductive member from other components. Since the electrically conductive member is substantially insulated by the rotor, undesirable arcing from the conductive member to other components is reduced.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 1 is a pictorial view showing an overall construction and arrangement of an orbital welding assembly of the present invention;

FIG. 4 is an exploded pictorial view of the orbital weld head illustrated in FIG. 1.

DETAILED DESCRIPTION OF THE PREFERRED EMBODIMENTS

For the purposes of illustrating a preferred embodiment of the invention only, and not for the purpose of limiting same, FIG. 1 shows an overall construction and arrangement of an orbital welding assembly formed according to the subject invention. The welding assembly comprises a motor and drive module A which is arranged releasably connected to a transmission and welding head module B which is associated with a tube clamp and holding module C. The motor and drive module A comprises an elongated small diameter electric motor and drive shaft as described in U.S. Pat. No. 5,136,134.

Merely by way of explanation and general background, the various components of the welding assembly are arranged and constructed to be quickly and rapidly assembled and disassembled. For example, the motor assembly can be used with different welding head modules. Additionally and for further example, the tube clamp and holding assembly C (fixture block) is quickly and easily releasable from the welding assembly such that it can be separately connected to and positioned relative to the tubing to be joined. In this manner, a multiple number of such tube clamping and holding units can be used with a single welding head assembly to allow welding to take place while additional tube ends are clamped in alignment by additional clamping and holding modules in preparation for welding operation.

With further reference to FIG. 1, a housing defines a weld head 10 generally formed of two mating pieces (subsequently described) which are joined together by fastening members such as screws, or are simply snapped together. At one end of the motor drive assembly A, there is provided a central inlet opening or passage through which electrical power lines 12 or other cables enter the motor and drive assembly A. Also entering through the opening is a gas supply line 14 which supplies a purge gas to the weld head 10 and tubing workpiece through a flow line provided through the weld head. The lines 12, 14 are enclosed by a protective cover 16.

Figure 2A:
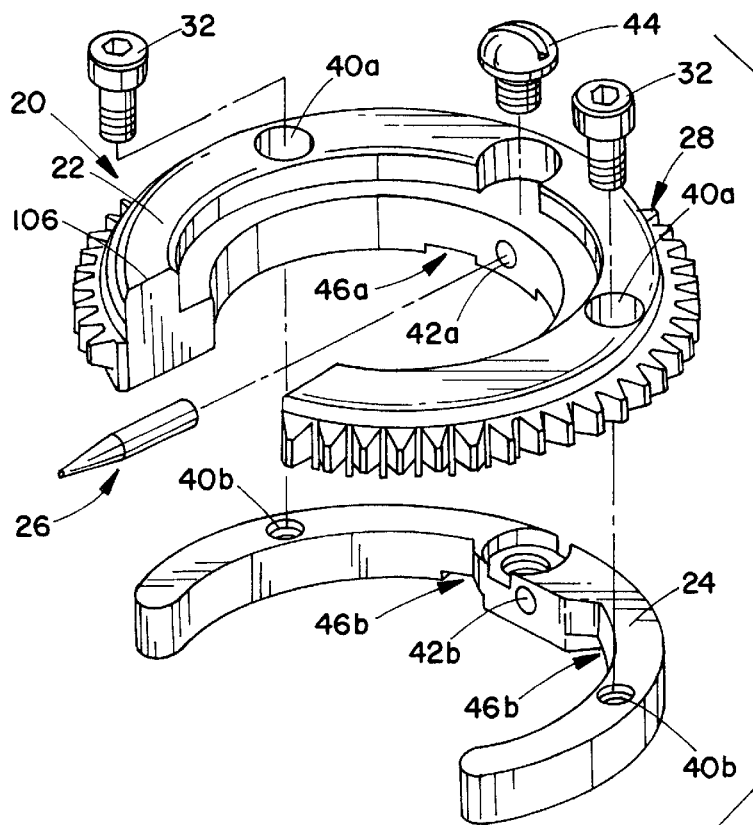
FIGS. 2A and 2B show opposing views of the rotor assembly in accordance with the present invention.
Figure 2B:
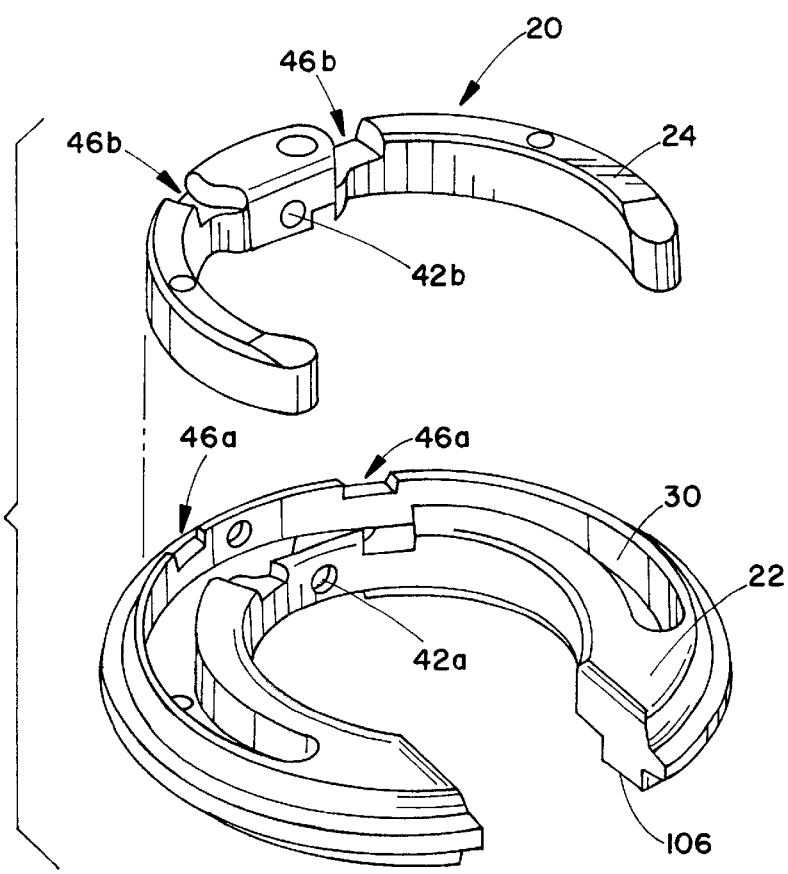

With further reference to FIG. 1 and FIG. 2, the weld head 10 is configured to receive a generally C-shaped rotor assembly 20. The rotor assembly 20 includes a drive member or rotor 22, an electrically conductive member 24, and a welding electrode 26. The rotor 22 is molded or machined from any suitable material such as a non-conductive thermoplastic or other non-conductive material having adequate strength, temperature resistance, and insulating characteristics. Preferably, the non-conductive or insulating material is polybenzimidazole (PBI) or a suitable ceramic material. The rotor 22 carries teeth 28 along its outside periphery which extend radially outward. The teeth are also made from the same insulating material as the rotor and, in the preferred form, the teeth 28 are integral with the rotor 22. When the rotor is housed within weld head lo, the teeth 28 engage drive gears of a drive assembly (subsequently described) which rotate the rotor assembly during a weld. Alternately, the sides of the rotor 22 frictionally engage the drive assembly without using teeth as shown in FIG. 2B.

Figure 3A:
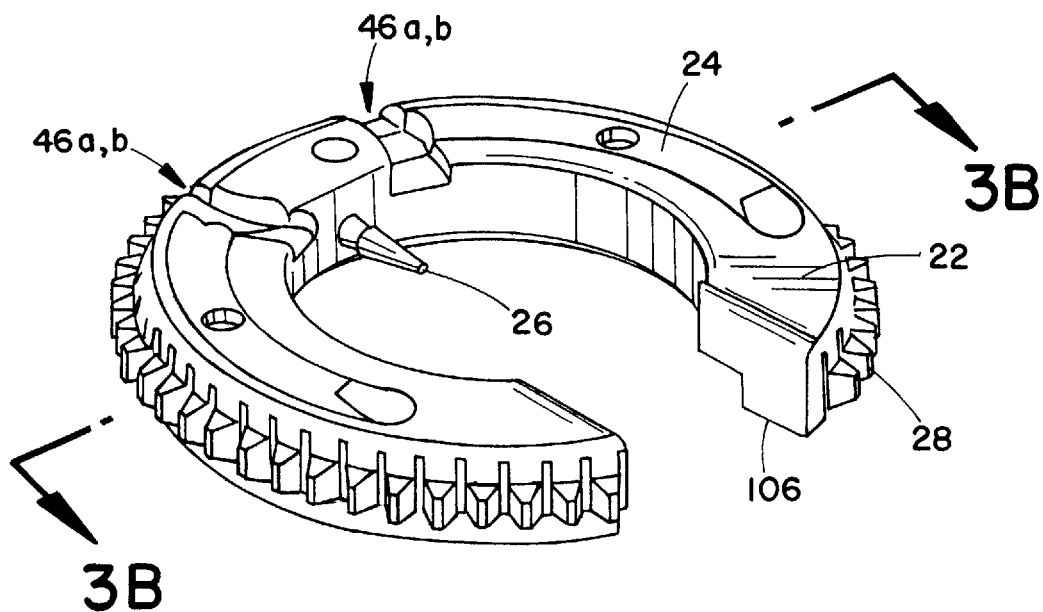
FIG. 3A illustrates an assembled rotor assembly in accordance with the present invention.
Figure 3B:
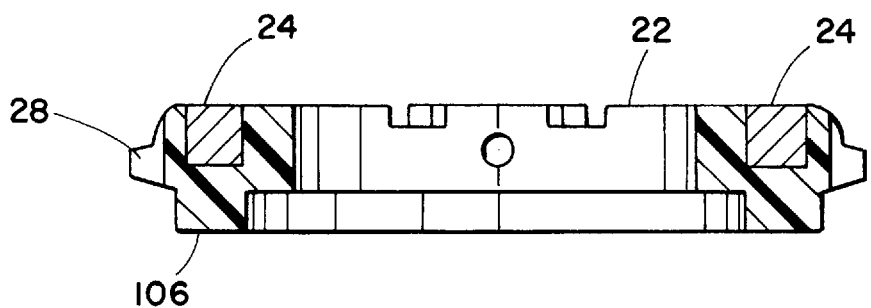
FIG. 3B shows a cross-sectional view of the rotor assembly of FIG. 3A.

The rotor 22 is configured to receive the electrically conductive member 24 which is formed from a material such as copper. Preferably, one side of the rotor 22 defines a slot or cavity 30 which extends through at least a portion of the one side. The slot 30 has a configuration and sufficient depth to fully and closely receive the conductive member 24. The conductive member 24 can be slid in or snapped into the slot 30. Preferably when disposed in slot 30, an exposed surface of the conductive member 24 aligns with, and is coplanar with the surface of the rotor 22 as shown in FIGS. 3A and 3B. Alternately, other slot depths can be used. As shown in FIG. 3B, the conductive member has a generally rectangular cross-section. Of course, other suitable shapes may be used.

Once in the slot 30, the conductive member 24 is substantially enclosed by the rotor 22. By inserting the conductive member 24 within the insulating rotor 22, electrical potential between the conductive member and other components is reduced. This, in turn, reduces the risk of arcing from points other than the welding electrode 26. Additionally, since the teeth 28 are also made from non-conductive material, electrical potential between the rotor 22 and other components is reduced. This further reduces the risk of undesirable arcing.

The rotor 22 and conductive member 24 are positively joined in any convenient manner. In the form shown, one or more aligned holes 40a and 40b are provided for receiving mounting screws 32 to mechanically secure the rotor and conductive member together.

The rotor 22 and conductive member 24 further include aligned holes 42a and 42b for receiving the welding electrode 26. An electrode screw 44 is used to secure the electrode 26 to the rotor assembly 20. The electrode 26 is in electrical contact with the conductive member 24 so that current and/or voltage is transmitted therebetween.

Channels 46a and 46b are provided along both the rotor 22 and the conductive member 24 to allow fluid communication of a purge gas from the gas supply line 14 to the area surrounding the electrode 26 during welding. Of course, any number of channels can be provided. The purge gas is preferably argon, but can be any of the inert gases. The purge gas protects the electrode 26 from overheating and provides an environment for plasma to be initiated during a weld as is known in the art. The purge gas also eliminates oxides on the surface of the workpiece being welded which avoids color change in the workpiece. Additional gases may be added to the purge gas in order to produce a desired effect as is known in the art. For example, hydrogen may be added to increase the welding temperature.

The details of construction of the weld head 10 are best illustrated in FIG. 4. As shown therein, the orbital weld head is connected to the opposite end of a flexible drive shaft assembly 80. The orbital weld head 10 generally comprises an outer frame and housing 90 which is defined by a pair of opposed body sections or members 92 and 94. These sections are suitably molded or machined from a non-conductive, high strength, high temperature resistant material. The body sections 92, 94 are joined in a mating relationship in any suitable manner such as through the use of socket head machine screws 96. It should be seen that the body sections 92, 94 each include a first generally rectangular end portion or body section 92A and 94A respectively. These sections cooperate to define an internal chamber of generally rectangular shape into which a right angle drive assembly 98 is releasably received. The details and arrangement of the drive assembly 98 will subsequently be described. For the present, however, it should be noted that the body members 92 and 94 each further include relatively thinner and smaller generally rectangular sections or members 92B and 94B respectively. These sections are arranged to house the gearing and transmission elements for transmitting rotary motion from the right angle drive assembly 98 to the rotor 22. More particularly, each of the sections 92B and 94B cooperate to define a tube receiving through opening 100 and a laterally open entrance area 102. This arrangement allows the tube ends to be positioned in abutment and the weld head moved laterally thereover to bring the abutted tube ends into alignment with the rotor assembly at the location necessary for performing the weld. The tube ends are suitably held in proper alignment and position by the tube holding and clamping assembly C as is known in the art.

As shown, the rotor 22 is generally circular in shape but has an open side or opening 104 which is of a width sufficient to allow the rotor to pass over the exterior diameter of the particular size of tubing which the weld head 10 is intended to weld. At least one side of the rotor 22 has a continuous convex configuration to define a circular guide surface 106. The body section 92B is provided with an inwardly extending machined groove 110 which is concentric with the opening 100 and provides a guide track which receives the guide surface 106. In the body section 94B, there is a circular recess 112 which is coaxial with the opening 100 and is machined to receive an electrically conductive circular brush member 114. The brush member 114 has a circular shape with its upper surface shaped to form a complementary guide track which is in electrical contact with the conductive member 24 of the rotor assembly 20. The surface is identified with the numeral 116 and extends circumferentially about the opening 100. The brush member 114 is connected through an electrical bus bar 118 with a connector 120 which is joined to the end of the power cable 12 (shown in FIG. 1). The power cable 12 is electrically connected with a plug element 122 which extends outwardly adjacent the sections 92B and 94B as illustrated in FIG. 4. This completes an electrical circuit from cable 12 to the welding electrode 26.

The rotor assembly 20 carries the electrode 26 which is a suitable tungsten electrode. As can be appreciated, rotation of the rotor 22 about the axis of opening 100 allows a weld to be performed on abutting tube ends suitably positioned within the opening 100 in a manner well known in the art.

The rotation of the rotor 22 is accomplished through a gear train connected with the right angle drive assembly 98. In this regard, the outer periphery of the rotor 22 is provided with gear teeth 28 which mate with corresponding teeth carried on the individual mating gears 132 and 134. Gears 132 and 134 are positioned as shown and carried on suitable pins and bearings mounted in the section 94B as illustrated. Drive gear 136 is in driving engagement with the gears 132 and 134 to provide two separate drive trains from the right angle drive unit 98. This allows drive to be maintained even though the rotor assembly 20 includes the opening 104. That is, the gears 132 and 134 are spaced apart a distance greater than the opening 104 so that one or the other of the gears is always in contact with the geared periphery of the rotor 22 at all times. The drive gear 136 is, of course, in driving engagement with the output gear 140 of the right angle drive assembly 98.

It should be noted that the right angle drive assembly 98 includes a block frame or housing element 142 which is preferably formed from a high strength thermoplastic or aluminum and sized to be closely received and located by the recesses formed within the body sections 92A and 94A in the manner illustrated. The output gear 140 is suitably carried on a bearing and pin assembly which extends from the housing or frame element 142. A bevel gear element 144 is formed integrally with the output gear 140 and mates with a corresponding bevel gear 146 mounted horizontally in a pair of bearings 148. The bearings 148 are suitably received in an opening 151 formed at the right hand end of block 142. A drive lug from a flexible drive element (not shown) is received in the interior of the shaft joined to the bevel gear 146 and is connected therewith through the use of a C-ring 152. This connection is also arranged to allow axial movement of the shaft portion 150 relative to the bevel gear 146 to permit axial movement as required during bending of the flexible drive cable 80. This connection is formed by flats on the sides of shaft portion 150 which slidably engage the C-ring 152. By forming the right angle drive unit as a separate component with its own frame, maintenance, repair, and replacement of the drive is simplified.

The exterior housing of the flexible drive cable assembly 80 is connected at its end through a metal sleeve or end portion 156 that is clamped between the body sections 92A and 94A and joined thereto through a socket head machine screw 158.

In addition, connecting means 153 is provided to section 92a. Connecting means 153 is hinged to body section 92a with pin means 155. The connecting means secures the welding head module B with the fixture block C by rotating the connecting means 153 to a locking position with the fixture block C.

The present rotor assembly minimizes arcing from the rotor 22 to the fixture block C. The rotor 22, which substantially encloses the conductive member 24, further electrically insulates the conductive member 24 from the fixture block C and the other components.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An orbital welding apparatus comprising:
    a housing defining a weld head and configured to receive a rotor having a generally C-shape, drive surfaces in the housing for engaging and rotating a received rotor about a first axis;
    a rotor disposed in the housing, the rotor being electrically non-conductive and having a generally C-shape, one side of the rotor defining a cavity therein along a portion of the one side;
    an electrically conductive member disposed in the cavity of the rotor, the electrically conductive member being substantially enclosed by the rotor; and,
    a welding electrode carried by the rotor and extending radially inward toward the first axis, the welding electrode being in electrical contact with the electrically conductive member.

2. The orbital welding apparatus as set forth in claim 1 wherein the rotor includes a plurality of teeth along an outside periphery of the rotor and extending radially outward from the first axis.

3. The orbital welding apparatus as set forth in claim 2 wherein the rotor and the plurality of teeth are made from one of polybenzimidazole and a ceramic material.

4. The orbital welding apparatus as set forth in claim 1 further including means for securing the rotor and the electrically conductive member together.

5. The orbital welding apparatus as set forth in claim 1 wherein the rotor further includes at least one channel for communicating gas to the welding electrode from a gas supply line extending into the weld head.

6. In an orbital welding apparatus for welding ends of cylindrical components, the orbital welding apparatus including a housing defining a weld head configured to receive and rotate a rotor assembly about an axis, the rotor assembly carrying a welding electrode which extends radially inward toward the axis, the improvement comprising:
    a rotor in the rotor assembly disposed in the weld head, the rotor having an electrically conductive member disposed therein, the electrically conductive member being insulated by the rotor and being in electrical contact with the welding electrode.

7. In the orbital welding apparatus as set forth in claim 6, the improvement further including:
    the rotor defining a slot along one side of the rotor for receiving the electrically conductive member therein.

8. In the orbital welding apparatus as set forth in claim 6, the improvement further including:
    the rotor being made from a material which is electrically non-conductive and temperature resistant.

9. In the orbital welding apparatus as set forth in claim 8, the improvement further including:
    the material being one of a polybenzimidazole and a ceramic.

10. In the orbital welding apparatus as set forth in claim 6, the improvement further including:
    the rotor having a plurality of teeth along an outside periphery and extending radially outward from the axis.

11. In the orbital welding apparatus as set forth in claim 6, the improvement further including:
    a means for securing the electrically conductive member to the rotor.

12. A welding apparatus comprising:
a housing defining a weld head, the weld head including a driver for rotating a received rotor assembly about an axis; and,
a rotor assembly disposed in the weld head, the rotor assembly comprising a C-shaped insulating member, a C-shaped electrically conductive member, and a welding electrode, the insulating member being configured to receive the electrically conductive member therein, the welding electrode being carried by the insulating member and being in electrical contact with the electrically conductive member.

13. The welding apparatus as set forth in claim 12 wherein the insulating member further includes a plurality of teeth disposed around an outside periphery, the driver of the weld head engaging the plurality of teeth of the insulating member for rotating the rotor assembly.

14. The welding apparatus as set forth in claim 12 wherein the insulating member is fabricated from a material which is electrically non-conductive and temperature resistant.

15. The welding apparatus as set forth in claim 14 wherein the material is one of a polybenzimidazole and a ceramic.

16. The welding apparatus as set forth in claim 12 further including a power supply line connected to the housing, the housing further including a conductor for receiving power from the power supply line, the conductor being in electrical contact with the electrically conductive member of the rotor assembly.

17. A welding apparatus comprising:
a housing defining a weld head and configured to receive a rotor;
a rotor disposed in the housing, the rotor being electrically non-conductive, one side of the rotor defining a cavity therein along a portion of the one side;
an electrically conductive member disposed in the cavity of the rotor, and
a welding electrode carried by the rotor with the welding electrode being in electrical contact with the electrically conductive member.

18. A rotor for use in a welding apparatus, the rotor comprising:
a first side of the rotor having a cavity;
an electrically conductive member disposed in said cavity;
said rotor comprising an electrically non-conductive material;
a welding electrode carried by the rotor with the electrode being in electrical contact with the conductive member.

* * * * *